United States Patent
Onandia

[11] Patent Number: 5,495,086
[45] Date of Patent: Feb. 27, 1996

[54] SEMI-AUTOMATIC WIRE-THREADING DEVICE FOR ELECTROEROSION MACHINES

[76] Inventor: Jose M. Onandia, Eguzkitza, s/n.-48200 Durango, Vizcaya, Spain

[21] Appl. No.: 207,568

[22] Filed: Mar. 4, 1994

[51] Int. Cl.⁶ .................................................. B23H 7/10
[52] U.S. Cl. .............................................. 219/69.12
[58] Field of Search ........................................ 219/69.12

[56] References Cited

U.S. PATENT DOCUMENTS

| 5,045,662 | 9/1991 | Yamada | 219/69.12 |
| 5,073,691 | 12/1991 | Magara et al. | 219/69.12 |

FOREIGN PATENT DOCUMENTS

| 1-321126 | 12/1989 | Japan | 219/69.12 |
| 4-105822 | 4/1992 | Japan | 219/69.12 |
| 5-92322 | 4/1993 | Japan | 219/69.12 |

*Primary Examiner*—Geoffrey S. Evans
*Attorney, Agent, or Firm*—Lucas & Just

[57] ABSTRACT

Semi-automatic wire threading device for electroerosion machines, which has a main wire traction wheel in the lower head placed immediately below the piece to be machined, there being located at the outlet of said traction wheel a first guide funnel that discharges into a second funnel whose outlet has a funnelled shape projecting into an enclosure with a compressed air inlet and facing the inlet of an outlet guide tube, and there being provided, at the outlet of the guide tube, two wheels, one an auxiliary traction wheel and the other a loose wheel.

6 Claims, 1 Drawing Sheet

U.S. Patent    Feb. 27, 1996    5,495,086
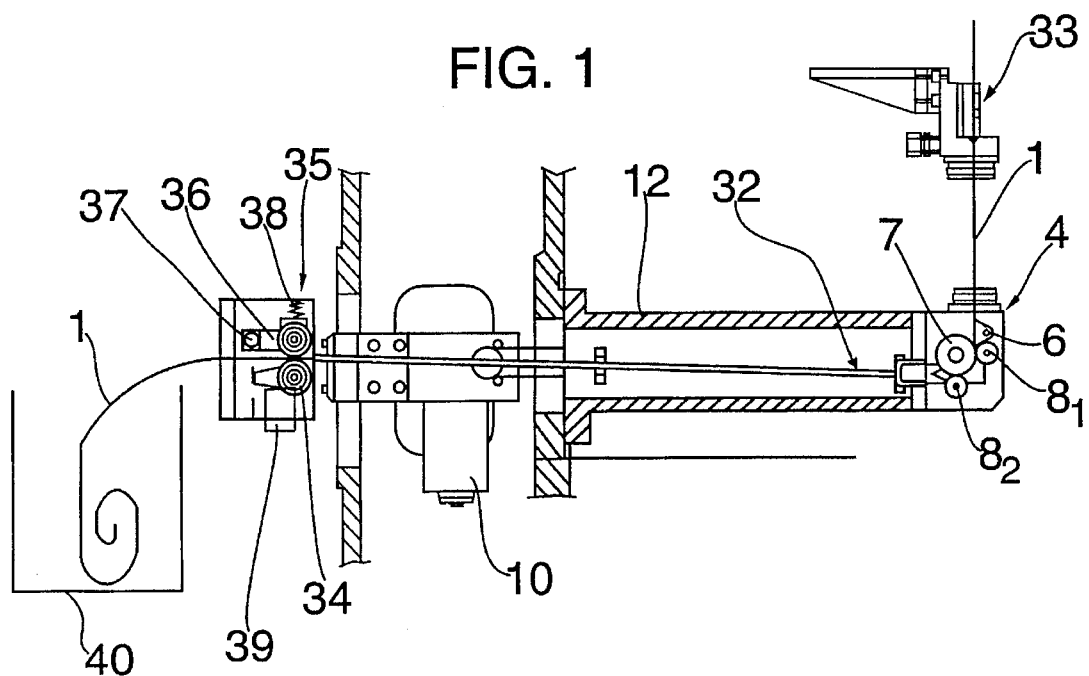
FIG. 1
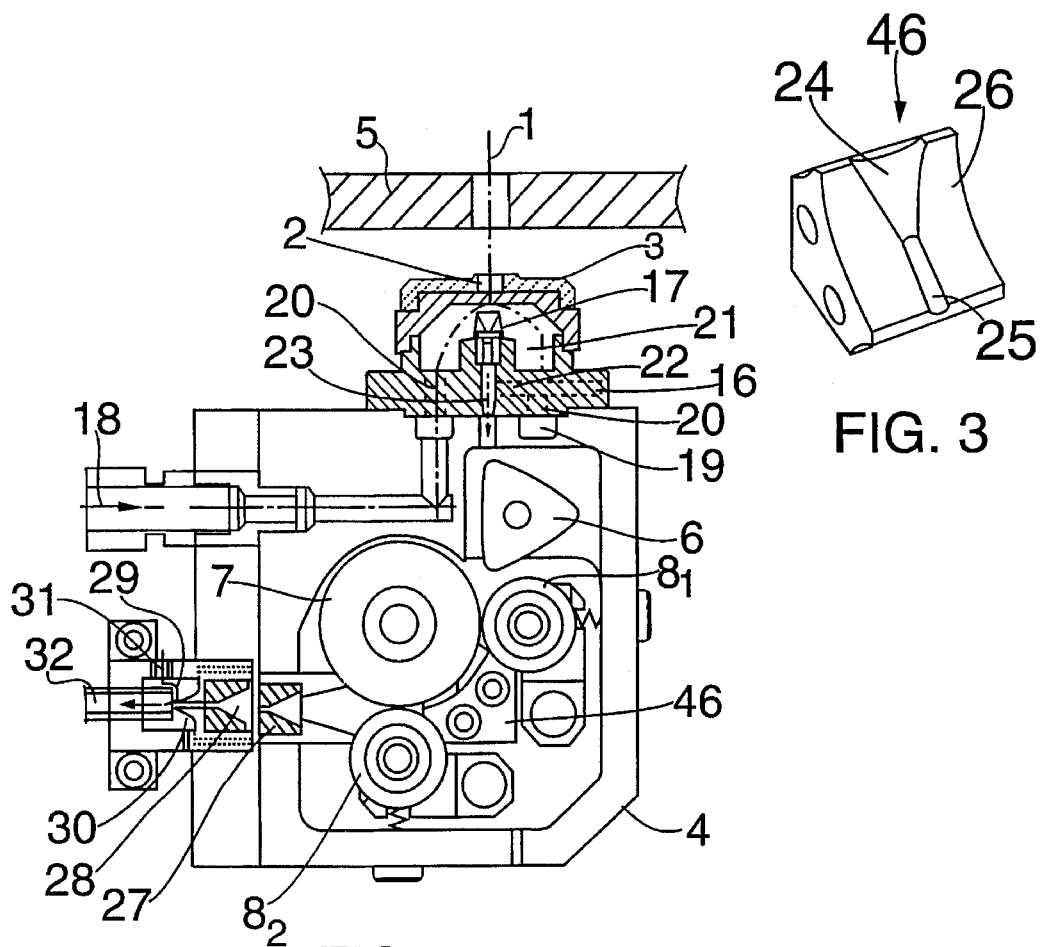
FIG. 2
FIG. 3

SEMI-AUTOMATIC WIRE-THREADING DEVICE FOR ELECTROEROSION MACHINES

The problems of threading wire in wire electroerosion machines, due to voluntary or involuntary breakage of the wire, are well known.

The applicant has developed a device which, carrying the wire in continuity without permitting its diversion, imparting funnelled entry shapes to its guide elements, and combining mechanical and fluid traction means, obtains a device which threads the wire in semi-automatic fashion.

The present invention procures a semi-automatic threading device for electroerosion machines which is characterized in that it provides a main wire-traction wheel in the lower head placed immediately below the piece to be machined, there being located at the outlet of said traction wheel a first guide funnel that discharges into a second funnel whose outlet has a funnelled shape projecting into an enclosure with a compressed air inlet and facing the inlet of an outlet guide tube, and there being provided, at the outlet of the guide tube, two wheels, one an auxiliary traction wheel and the other a loose wheel.

BRIEF DESCRIPTION OF THE DRAWINGS

FIG. 1 is a schematic view of the whole device.

FIG. 2 is a sectional view of the component elements of the lower head, as an element of the device of FIG. 1.

FIG. 3 is a perspective of a guide chute used in the lower head of FIG. 2.

DETAILED DESCRIPTION

The wire (1) which comes from the upper head (33), after performing its work on the piece to be machined (5), is introduced into the lower head (4) through the orifice (2) of the nozzle (3) of, for example, plastic material, that is joined to the flange (16) which has a lower guide (17) of minimum tolerance, for perfect guidance, with respect to the wire (1) and constituted of hard materials, for example, ceramics and diamond.

There is provided an inlet (18) for cleaning and cooling water which, by means of the toroidal recess (19) and corresponding orifices (20) in the flange (16), reaches the internal cavity (21) between nozzle (3) and flange (16) to exit to the outside through the orifice (2).

A transverse conduit (22) to the orifices (20) sends cooling water to the orifice (23) following the lower guide (17) of the wire (1).

The wire (1) makes contact at the current tap (6) and passes between the main traction wheel (7) and the first loose wheel ($8_1$).

Following the first loose wheel ($8_1$) there is provided a guide chute (46) which consists of a receiving funnel (24) and an outlet orifice (25), both arranged in continuity and sectioned over an approximately circumferential surface (26) facing the main traction wheel (7) and discharging onto the second loose wheel ($8_2$).

The wire (1) leaving the traction wheel (7) reaches a first funneled outlet guide (27), of ceramic material, and discharges into a second guide (28), likewise funneled and of ceramic, which conveys the wire (1), by means of a projecting funnel (30), to an enclosure (29) in which there has been provided an air inlet (31) which may be adjusted in accordance with air pressure requirements for dragging the wire and/or cleaning.

Following the projecting funnel (30), an outlet guide tube (32) carrying the wire (1) is provided.

The air that enters (31) strikes the walls of the projecting funnel (30) and penetrates through the outlet guide tube (32), drying the wire and facilitating its drag.

The arm (12) supporting the lower head (4) carries in its interior the outlet guide tube (32) which leads the wire (1) between an auxiliary traction wheel (34) and a loose wheel (35) whose arm (36) pivots on the shaft (37) and which is pressed against the auxiliary wheel (34) by the action of the spring (38).

The drive motor (39) of the auxiliary traction wheel (34) is a motor of low torque and high speed in comparison with the drive motor (10) of the main drag wheel (7), with the aim of being subordinate to it in function.

The wire (1) then goes to a used wire bin (40).

I claim:

1. Semi-automatic wire threading device for electroerosion machines, characterized in that there is provided a lower head placed immediately below a work piece to be machined, said lower head having a main traction wheel which has an outlet, there being located at the outlet of said traction wheel a first guide funnel that discharges into a second funnel, said second funnel having an outlet which is funnel shaped and projects into an enclosure with a compressed air inlet and facing the inlet of an outlet guide tube, and there being provided, at the outlet of the guide tube an auxiliary traction wheel and a first loose wheel.

2. Semi-automatic wire threading device for electroerosion machines, according to claim 1, characterized in that a wire enters the lower head through an orifice of a nozzle, passes to a lower guide of minimum tolerance with respect to the wire, and through a conducting orifice in the flange emerges to make contact with a current tap.

3. Semi-automatic wire threading device for electroerosion machines, according to claim 1, characterized in that there is provided an inlet for water which, by a conduit, communicates with a space between the nozzle and the flange and exits through an orifice of a nozzle.

4. Semi-automatic wire threading device for electroerosion machines, according to claim 3, characterized in that the conduit has a bypass that communicates with a conducting orifice of the flange.

5. Semi-automatic wire threading device for electroerosion machines, according to claim 1, characterized in that a drive motor of the auxiliary traction wheel has lower torque and greater nominal speed than a motor of the main traction wheel.

6. Semi-automatic wire threading device for electroerosion machines, according to claim 1, characterized in second and third loose wheels are pressed against the traction wheel, and between the second and third loose wheels there is provided a guide chute having an approximately cylindrical surface, facing the main traction wheel and having a receiving funnel and outlet orifice arranged in continuity.

* * * * *